といった

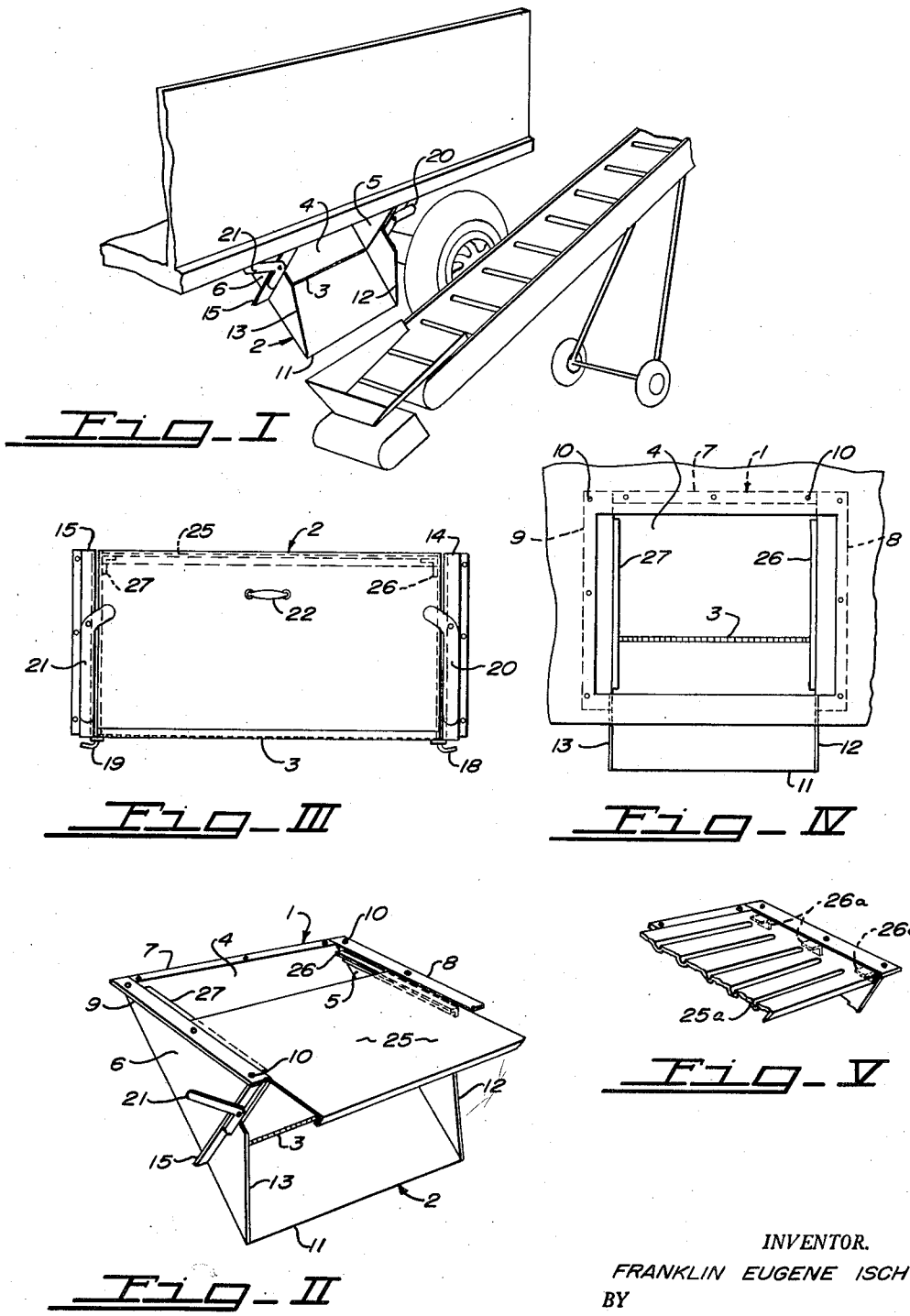

United States Patent Office 2,814,375
Patented Nov. 26, 1957

2,814,375

UNLOADING CHUTE

Franklin Eugene Isch, Walbridge, Ohio

Application September 21, 1954, Serial No. 457,355

6 Claims. (Cl. 193—4)

This application is a continuation in part of my application Serial No. 247,259, filed September 9, 1951, and my application Serial No. 425,211, filed April 23, 1954, both now abandoned.

The device of my invention as hereinafter described and claimed is an unloading chute mounted or adapted to be mounted beneath the floor of a vehicle body to facilitate the unloading of flowable commodities from the interior of such body.

A general object of my invention is to provide a chute structure which when incorporated with a vehicle body and closed will retain the contents of the body and which when opened will permit granular, lumpy or other flowable commodities to be discharged through the chute by gravity.

A further object is to provide a chute installation to which the contents of a vehicle body may be fed without lifting the contents and which will discharge by gravity the contents so fed to it.

A further object is to provide a chute installation such as is outlined in the previously stated object which incorporates a valve to control the initial flow of material being discharged by gravity.

Still a further object is to provide means for withdrawing flowable contents through the floor of a vehicle body and conducting such contents to a receptacle located at the side of the vehicle.

Another object is to provide a chute structure which when incorporated with the floor of a vehicle body has no parts projecting into the interior of the body and no parts in position to interfere with the loading, unloading and shifting over the floor of bulky objects, and which chute structure may be covered by a door that registers smoothly with the adjacent portions of the floor.

Another object is to provide a chute structure which when incorporated with a vehicle body frames an opening through the floor of the body and strengthens and supports parts of floor surrounding such opening.

Still another object is to provide a vehicle body with a chute structure so incorporated therewith as to project downwardly between the rear and front wheels of the vehicle and thus be subject to minimum liability of damage by striking obstructions as the vehicle moves.

Ancillary objects are to provide a chute structure such as is above outlined which is of sturdy and economical construction which is capable of being incorporated with a vehicle body by relatively unskilled persons using ordinary hand tools and which when installed will function reliably when handled by unskilled operators.

Other objects and advantages will be apparent from the following description illustrated by the accompanying drawings wherein:

Fig. I is a view in perspective showing a portion of a vehicle with an unloading chute constructed in accordance with my invention incorporated therewith, the discharge end of said chute being open, and the lower end of a portable elevator of well known type being located at the side of the vehicle with its receiving hopper beneath the discharge end of the chute;

Fig. II is a view in perspective showing the chute structure per se with its discharge end open;

Fig. III is an end view of the chute per se with its discharge end closed;

Fig. IV is a plan view of a fragment of a vehicle floor having the chute mounted therebeneath; and Fig. V is a fragmentary view in perspective showing a modified form of valve mechanism.

The vehicle may be of any type the body of which has a floor with a flat area to which the chute structure may be secured.

The chute per se comprises a main trough 1 and a supplemental trough 2 which are articulated, preferably by means of a "piano" type hinge 3. The main trough 1 and the supplemental trough 2 are formed of heavy sheet metal.

The main trough has a substantially rectangular planar bottom section 4 and triangular planar side sections 5 and 6 extending perpendicularly, or at slightly obtuse angles, to the bottom section 4. Flanges 7, 8 and 9 are formed along the edges of the bottom and side sections. The said flanges lie along the same plane and are pierced adjacent their outer edges by holes 10 to receive bolts for securing the main trough 1 to the floor of a vehicle body.

The supplemental trough 2 is formed with a substantially rectangular planar bottom section 11 and substantially trapezoidal side sections 12 and 13. The dimensions of the bottom section 11 are such that when the supplemental trough 2 is swung upwardly the bottom section 11 will extend over and close the lower end of the trough 1 and the trapezoidal side sections 12 and 13 will lie outside the triangular side sections 5 and 6.

Rigid bars 14 and 15 are secured, by welding or otherwise, at their upper ends to the flanges 8 and 9 and at their lower ends to the bottom section 4 of the main trough 1. The bars 14 and 15 are spaced slightly from and parallel to the triangular side sections 5 and 6 of the main trough, so that the trapezoidal side sections of the supplemental trough may slide between the bars and the triangular side sections.

The trapezoidal side sections 12 and 13 have stop flanges 18 and 19 along their rear edges which, when the supplemental trough is lowered to the position in which it is shown in Figs. I and II, engage behind the bars 14 and 15 to prevent the bottom section from swinging below the plane of the bottom section 4. Hence when the supplemental trough is lowered its bottom section extends along the same plane as the bottom section of the main trough.

In order to hold the supplemental trough 2 in the position where it functions to close the lower end of the main trough 1 a pair of latches 20 and 21 are pivoted to the bars 14 and 15 respectively. Each of the latches 20 and 21 is shaped like a bell crank lever one arm of which serves as a handle and the other arm of which may be swung to overlie the exterior of the supplemental trough 2 when the supplemental trough has been swung into position to close the lower end of the main trough (see Fig. III).

When it is desired to lower the supplemental trough 2 to the position in which it is shown in Figs. I, II and IV, where it functions as an extension of the main trough 1, the latches 20 and 21 are turned to the positions in which they are shown in Figs. I and II. To facilitate manipulation of the supplemental trough 2 it is provided with a handle 22.

To incorporate the chute with a vehicle body a rectangular opening is cut into the floor of the vehicle body, the fore and aft dimension of the opening being somewhat greater than the dimension of the space encompassed between the flanges 8 and 9. If for example the flanges 8 and 9 are each 2 inches in width and the flanges are 23 inches apart the length of the opening may be made 25 inches. If the upper mouth of the main trough 1 along which the flanges 8 and 9 extend is 21 inches in width the opening in the floor of the vehicle also should be made 21 inches in width. The opening should be located with one side about 3 inches inward from the side of the vehicle body and the opening preferably should be about midway between the front and rear ends of the vehicle body floor.

When the chute structure is bolted in place below the opening the flanges 8 and 9 will frame the floor boards where they surround the opening and cause the floor boards to mutually support and reinforce each other. The flanges 8 and 9 extend inwardly at the front and rear edges of the opening to form supports for a door, which in some cases may consist of the cutout pieces of floor board. A door of the same thickness as the cutout pieces will lie flush with the boards surrounding the cutout portion to reconstitute a smooth floor over which bulky objects such as bales of hay, materials in sacks, implements, furniture and the like can be slid.

The chute thus incorporated with the vehicle body projects downwardly between the rear and the front wheels. When the chute is closed no part of it extends beyond the side of the vehicle body and since the chute is located between the rear and the front wheels it is not liable to damage by being dragged over high centers of rutted roadways or by striking bumps that are straddled by the wheels when the vehicle is being driven over rough terrain.

The chute of my invention thus incorporated with a vehicle body extends when opened about 5 inches laterally of the side of the vehicle body in advantageous position to direct the commodity being unloaded into the hopper of a portable elevator or into a pit, manhole or other opening or receptacle to the side of which the vehicle has been driven.

In handling some free flowing commodities it is preferable to lower the supplemental trough 2 gradually to avoid a sudden gush of commodity that may momentarily overload a portable elevator or momentarily over flow the elevator's receiving hopper. To obviate this possibility if the supplemental trough is accidently or carelessly dropped the chute may be equipped with a valve consisting of a plate 25 slidable upon strips 26 and 27 of angle form which are welded to the side sections 5 and 6 of the main trough 1 slightly below the level of the flanges 10.

The front edge of the plate 25 is bent down and slightly back to function as a stiffening reinforcement and also as a finger piece by means which the operator can withdraw the plate gradually to open the valve to any extent desired (see Fig. II). The plate 25 can be completely withdrawn and laid aside when it no longer is needed. In fact the chute is practically operative under many circumstances if the plate 25 and the angle form strips 26 and 27 are not incorporated in the device at all.

In the modification shown in Fig. V brackets 26a are substituted for the angle form strips and the plate 25a is embossed to stiffen it. The embossed plate may of course be used with angle form strips rather than brackets.

When the chute is open the section 4 of the main trough 1 and the section 11 of the supplemental trough 2 slope downwardly at an angle to the horizontal of approximately 35 degrees. Grains such as shelled corn, wheat and oats, legumes such as beans, peas and soy beans, and lumpy commodities such as ear corn, broken stone and coal all flow freely down this 35 degrees' slope. A major part of the contents of a vehicle body can be discharged by merely opening the chute and the residue can be unloaded by simply pushing it toward the opening. There is no necessity for lifting or shoveling the commodity over the side of the vehicle body or for carrying the commodity to the rear of the vehicle.

It is to be understood that the foregoing description and the accompanying drawings are exemplary only and that the invention is susceptible to variation and modification within the spirit and scope of the subjoined claims.

Having described the invention, I claim:

1. An unloading chute to be mounted against the underside of a normally horizontal flat floor of a vehicle body, said unloading chute comprising a main trough and a supplemental trough adapted to be alternatively lowered into chute extending position or raised into chute closing position, said main trough being formed integrally of sheet metal and having a rectangular bottom section and triangular side sections extending upwardly from the edges of said bottom section, there being flanges extending from an edge of each of said side sections and from an edge of said bottom section, the flanges extending from the edges of said side sections being straight and parallel and adapted to lie along the sides of a rectangular opening in the floor of such vehicle body and all of said flanges lying approximately in the same plane, said supplemental trough having a bottom section and trapezoidal side sections, a hinge connecting the bottom section of said supplemental trough to the bottom section of said main trough, said trapezoidal side sections of said supplemental trough embracing the side sections of said main trough and slidable thereover when said supplemental trough is turned about said hinge, and means to prevent said supplemental trough from swinging below a position in which its bottom section is substantially coplanar with the bottom section of said main trough.

2. An unloading chute to be mounted against the underside of a flat floor of a vehicle body, said unloading chute comprising a main trough and a supplemental trough adapted to be alternatively lowered into chute extending position or raised into chute closing position, said main trough being formed integrally of sheet metal and having a bottom section and side sections extending upwardly from said bottom section, there being flanges extending from an edge of each of said side sections and from an edge of said bottom section, the flanges extending from the edges of said side sections being straight and parallel and adapted to be secured along the side of a rectangular opening in the floor of such vehicle body with the bottom of said main trough sloping downward and laterally and all of said flanges lying approximately in the same plane, said supplemental trough having a bottom section and side sections, a hinge connecting the bottom section of said supplemental trough to the bottom section of said main trough, said side sections of said supplemental trough embracing the side sections of said main trough and slidable thereover when said supplemental trough is turned about said hinge, means to prevent said supplemental trough from swinging below a position in which its bottom section is substantially coplanar with the bottom section of said main trough and a pair of latch members pivoted to said bars and having arms adapted to be positioned exteriorly of said supplemental trough when said supplemental trough is raised into chute closing position, to latch said supplemental trough in such chute closing position.

3. An unloading chute to be mounted against the underside of a normally horizontal flat floor of a vehicle body, said unloading chute comprising a main trough and a supplemental trough adapted to be alternatively lowered into chute extending position or raised into chute closing position, said main trough having a bottom section and side sections extending upwardly from said bottom section, there being flanges extending from an edge of each of said side sections, said flanges lying approximately in the same plane, said flanges being parallel and adapted to be secured along the sides of a rectangular opening in the floor of such vehicle body, said supplemental trough having a bottom section and side sections, a hinge connecting the bottom section of said supplemental trough to the bottom section of said main trough, said side sections of said supplemental trough embracing the side sections of said main trough and slidable thereover when said supplemental trough is turned about said hinge, a pair of bars secured to said main trough and lying exteriorly of the side sections of said supplemental trough, said side sections of said supplemental trough having stop flanges fixed thereto and engageable with said bars to prevent said supplemental trough from swinging below a position in which its bottom section is substantially coplanar with the bottom section of said main trough and a pair of latch members adapted to be positioned exteriorly of said supplemental trough when said supplemental trough is raised into chute closing position, to latch said supplemental trough in such chute closing position.

4. An unloading chute to be mounted against the underside of a flat floor of a vehicle body, said unloading chute comprising a main trough and a supplemental trough adapted to be alternatively lowered into chute extending position or raised into chute closing position, said main trough being formed integrally of sheet metal and having a rectangular bottom section and triangular side sections extending upwardly from the edges of said bottom section, there being flanges extending from an edge of each of said side sections and from an edge of said bottom section, the flanges extending from edges of said side sections being parallel and adapted to be secured along the sides of a rectangular opening in the floor of said vehicle body, all of said flanges lying approximately in the same plane, said supplemental trough having a bottom section and trapezoidal side sections a hinge connecting the bottom section of said supplemental trough to the bottom section of said main trough, said trapezoidal side sections of said supplemental trough embracing the side sections of said main trough and slidable thereover when said supplemental trough is turned about said hinge, means to prevent said supplemental trough from swinging below a position in which its bottom section is substantially coplanar with the bottom section of said main trough and means to latch said supplemental trough in such chute closing position, said main trough having guide members secured thereto and a plate slidably supported by said guide members to function as a valve to control the rate of flow of commodities through such chute.

5. An unloading chute to be mounted against the underside of a normally horizontal flat floor of a vehicle body, said unloading chute comprising a main trough and a supplemental trough adapted to be alternatively lowered into chute extending position or raised into chute closing position, said main trough being formed integrally of sheet metal and having a bottom section and side sections extending upwardly from said bottom section, there being flanges extending from an edge of each of said side sections and from an edge of said bottom section, the flanges extending from edges of said side sections being parallel and adapted to be secured along the sides of a rectangular opening in the floor of such vehicle and all of said flanges lying approximately in the same plane, said supplemental trough having a bottom section and side sections a hinge connecting the bottom section of said supplemental trough to the bottom section of said main trough, said side sections of said supplemental trough embracing the side sections of said main trough and slidable thereover when said supplemental trough is turned about said hinge, and a pair of bars secured to the flanges extending from the side sections of said main trough and to the bottom section of said main trough and lying exteriorly of the side sections of said supplemental trough, said side sections of said supplemental trough having stop flanges fixed thereto and engageable with said bars to prevent said supplemental trough from swinging below a position in which its bottom section is substantially coplanar with the bottom section of said main trough, said main trough having guide members secured thereto and a plate slidably supported by said guide members to function as a valve to control the rate of flow of commodities through such chute.

6. An unloading chute to be mounted against the underside of a normally horizontal flat floor of a vehicle body, said unloading chute comprising a sheet metal main trough and a sheet metal supplemental trough adapted to be alternatively lowered into chute extending position or raised into chute closing position, said main trough having a bottom section and side sections extending upwardly from said bottom section, there being flanges extending from an edge of each of said side sections, said flanges lying approximately in the same plane, said flanges being parallel and adapted to be secured along sides of a rectangular opening in the floor of such vehicle said supplemental trough having a bottom section and side sections a hinge connecting the bottom section of said supplemental trough to the bottom section of said main trough, said side sections of said supplemental trough embracing the side sections of said main trough and slidable thereover when said supplemental trough is turned about said hinge, a pair of bars secured to said main trough and lying exteriorly of the side sections of said supplemental trough, said side sections of said supplemental trough having stop flanges fixed thereto and engageable with said bars to prevent said supplemental trough from swinging below a position in which its bottom section is substantially coplanar with the bottom section of said main trough and a pair of latch members adapted to be positioned exteriorly of said supplemental trough when said supplemental trough is raised into chute closing position, to latch said supplemental trough in such chute closing position, said main trough having guide members secured thereto and a plate slidably supported by said guide members to function as a valve to control the rate of flow of commodities through such chute.

References Cited in the file of this patent

UNITED STATES PATENTS

| | | |
|---|---|---|
| 160,861 | Adgate | Mar. 16, 1875 |
| 535,442 | Clark | Mar. 12, 1895 |
| 713,262 | White | Nov. 11, 1902 |
| 771,918 | Munn | Oct. 11, 1904 |
| 1,017,786 | Miller | Feb. 20, 1912 |
| 1,463,232 | Trimmer | July 31, 1923 |
| 1,961,307 | Stauffer | June 5, 1934 |
| 2,149,867 | Pierson | Mar. 7, 1939 |
| 2,678,121 | Phillips | May 11, 1954 |